United States Patent
Kimura et al.

[19]

[11] Patent Number: 5,999,792
[45] Date of Patent: Dec. 7, 1999

[54] DOCUMENT READING APPARATUS

[75] Inventors: Shogo Kimura, Nara; Hironori Tanaka, Yamatokooriyama, both of Japan

[73] Assignee: Sharp Kabushiki Kaisha, Osaka, Japan

[21] Appl. No.: 09/063,367

[22] Filed: Apr. 21, 1998

[30] Foreign Application Priority Data

Jun. 20, 1997 [JP] Japan ..................................... 9-164392

[51] Int. Cl.$^6$ .................................................. G03G 15/00
[52] U.S. Cl. ........................................... 399/367; 358/496
[58] Field of Search ................... 358/496, 498; 271/10.11, 123; 399/365, 367

[56] References Cited

U.S. PATENT DOCUMENTS

| | | | |
|---|---|---|---|
| 4,953,037 | 8/1990 | Ito et al. | 358/496 |
| 4,970,606 | 11/1990 | Shima | 358/474 |
| 4,975,787 | 12/1990 | Ijuin et al. | 358/461 |
| 5,157,520 | 10/1992 | Tanaka et al. | 358/498 |
| 5,224,191 | 6/1993 | Kanekura | 271/11.1 |
| 5,267,058 | 11/1993 | Sata | 358/498 |
| 5,661,571 | 8/1997 | Ijuin et al. | 358/471 |

FOREIGN PATENT DOCUMENTS 04032429  2/1992  Japan .

Primary Examiner—Robert Beatty
Attorney, Agent, or Firm—Nixon & Vanderhye P.C.

[57] ABSTRACT

A document reading apparatus includes: a feed section for supplying a document sheet; a sheet discharging section located downstream of the feed section in a direction of transporting the document sheet; a reading section located on the sheet discharging section or between the feed section and the sheet discharging section; and a sheet detecting section located upstream of the reading section. The document sheet is transported by a feed roller disposed in the feed section until the document sheet is nipped by a transport roller disposed in the sheet discharging section. The feed section being further provided with a sheet separating mechanism and a feed pinch roller and spring. The feed pinch roller being in contact with the feed roller via a document sheet and rotating in accordance with a rotation of the feed roller, and the spring pressing and urging the feed pinch roller so that a pressure of the feed pinch roller to the feed roller is greater than the force applied by the sheet separating mechanism. The sheet discharge section also includes a transport roller, pinch roller, and spring.

16 Claims, 4 Drawing Sheets

DOCUMENT READING APPARATUS

CROSS REFERENCES TO RELATED APPLICATIONS

This application is related to Japanese Patent Application No. HEI 09-164392, filed on Jun. 20, 1997 whose priority is claimed under 35 USC §119, the disclosure of which is incorporated herein by reference in its entirety.

BACKGROUND OF THE INVENTION

1. Field of the Invention

The present invention relates to a document reading apparatus. More particularly, the present invention relates to a document reading apparatus to be used as a scanner section for reading a document image on a sheet (paper sheet) in a facsimile apparatus, a printer, an electrophotographic copying machine, or the like. Especially, the present invention relates to a document reading apparatus in which dispersion (variance) of a starting position of reading a document sheet at a reading section is reduced and poor sheet transporting is prevented.

2. Description of the Related Arts

For example, as a feed mechanism constructed in a scanner section of a transmitting system of a facsimile apparatus, a simplified sheet feeding mechanism is often in practical use. In the simplified feed mechanism, one feed roller is disposed in a feed section and one transport roller performs functions both as a sheet guiding section which forwards to a reading section a document sheet supplied from a feed section and as a paper discharging section which discharges the document sheet after the document sheet is read.

As shown in FIG. 5, a conventional document reading apparatus equipped with a simplified feed mechanism includes, for example, a feed section 21 for feeding a document sheet, a sheet discharging section 22 disposed downstream of the feed section 21 in a feed direction, a sheet detecting section (sheet sensor 23) disposed between the feed section 21 and the sheet discharging section 22, and a reading section 24. The reference symbol L represents a sheet path and R.P. represents a reading position.

The feed section 21 is provided with a feed roller 25, a feed spring 26 for allowing the document sheet to fit on the feed roller 25, a separating rubber plate 27 for separating a plurality of document sheets, and a separating press plate 28 for pressing the separating rubber plate 27. The sheet sensor 23 detects a front edge of the document sheet upstream of the reading section 24. The reading section 24 is provided with an optical system unit 29 for reading the document sheet. The sheet discharging section 22 is provided with a transport roller 30 and a pinch roller 31 for pressing the transport roller 30. Further, a sheet tray 32 is mounted upstream of the feed roller 25; and a sheet guide 33 is mounted between the feed roller 25 and the optical system unit 29.

In the above construction, document sheets transported from the sheet tray 32 to the feed roller 25 are separated midway by the separating rubber plate 27 and, at the same time, a separated document sheet is guided to fit on the feed roller 25 by being pressed by the feed spring 26. At this time, the feed roller 25 is rotating at a constant speed in a direction shown by arrow (a), and the document sheets are transported to the reading section 24 one by one by the rotation of the feed roller 25.

Midway therebetween, the sheet sensor 23 detects the document sheet and, upon receiving a detection signal from the sheet sensor 23, the optical system unit 29 starts a reading operation. The front edge of the document sheet which has passed the reading section 24 is nipped between the transport roller 30 and the pinch roller 31 and, thereafter, the document sheet is transported in such a manner that the transport roller 30 receives the document sheet from the feed roller 25. Subsequently, the document sheet which has finished the reading operation is discharged by the transport roller 30.

FIG. 6 shows another prior art example of a document reading apparatus. The simplified feed mechanism shown in FIG. 6 is constructed generally in the same manner as in the above-described example except that the optical system unit 29 of the reading section 24 is disposed to face the transport roller 30. By this construction, the document sheet forwarded to the transport roller 30 is nipped between the transport roller 30 and the optical system unit 29, so that the document sheet is read by the optical system unit 29 at a position of contact with the transport roller 30.

On the other hand, Japanese Unexamined Patent Publication No. HEI 4(1992)-32429 discloses a feed mechanism for preventing feed of overlying transcription sheets. This mechanism is provided with a drive roller 131 and a pinch roller 132 disposed, between a feed roller pair (not shown) and a resist roller pair (not shown), at a position downstream of the sensor 141 detecting the transcription sheet, as shown in FIG. 7. Here, the pinch roller 132 is provided with a torque limiter comprising a spring pair 137 for urging the pinch roller 132 onto the drive roller 131, a hub 140 for allowing the pinch roller 132 to rotate in the same rotation direction as the drive roller 131, and a spring 139.

When only one transcription sheet is inserted between the drive roller 131 and the pinch roller 132, the torque limiter is actuated and the pinch roller 132 is rotated in accordance with the rotation of the drive roller 131 by a normal urging force of the spring 137. However, if a plurality of transcription sheets are inserted between the drive roller 131 and the pinch roller 132, the urging force of the spring 139 increases to release the torque limiter and the hub 140 drives the pinch roller 132 to rotate in the same direction as the drive roller 131 and, at the same time, the urging force of the spring pair 137 decreases, whereby only one transcription sheet which is in contact with the drive roller 131 is transported by the drive roller 131.

The above-mentioned prior art document reading apparatus shown in FIGS. 5 to 7 have the following drawbacks.

Namely, in feeding a document sheet to the optical system unit 29, the document sheet is transported between the feed roller 25 and the transport roller 30 only by the rotation operation of the feed roller 25 and the pressure of the separating rubber plate 27 which is pressed by the separating press plate 28. Therefore, a dispersion in the feed accuracy occurs by a combination of a condition of the document sheet based on a difference in the thickness and the surface friction coefficient, an environmental condition such as an ambient temperature and humidity, a dispersion in the pressing weight imposed upon the document sheet, and the like.

Accordingly, there is a problem that a dispersion of a starting position of reading the front edge of the document sheet occurs between the sheet sensor 23 and reading position of the optical system unit 29 due to a dispersion of the feed accuracy (amount of feeding the document sheet). Also, there is a fear that a reading elongation of the document sheet occurs at the downstream thereof between the reading position of the optical system unit 29 and the transport roller 30 due to poor feeding of sheet such as slippage.

On the other hand, the construction of the feed mechanism section shown in FIG. 7 provides a mechanism such that, when a plurality of overlying transcription sheets are transported, only one of the transcription sheets is sent out by means of the torque limiter operating in accordance with a balance of urging forces between the spring 137 and the spring 139. Here, the urging force of the spring 137 urging the pinch roller 132 onto the drive roller 131 changes when the urging force of the spring 139 changes. Therefore, as in the above-mentioned prior art, it is difficult to prevent generation of a dispersion in the starting position of reading the front edge of the document sheet and an elongation of the document sheet due to the dispersion in the feed accuracy with respect to a transcription sheet inserted between the pinch roller 132 and the drive roller 131.

SUMMARY OF THE INVENTION

The present invention has been made in order to solve the above-mentioned problems which are present in the prior art, and the purpose thereof is to provide a document reading apparatus having a simplified feed mechanism in which the dispersion in the starting position of reading the document sheet at the reading section and the poor feeding of sheet are reduced to a great extent.

Accordingly, the present invention provides a document reading apparatus comprising: a feed section for supplying a document sheet; a sheet discharging section located downstream of the feed section in a direction of supplying the document sheet; a reading section located on the sheet discharging section or between the feed section and the sheet discharging section; and a sheet detecting section located upstream of the reading section, wherein the document sheet is transported by a feed roller disposed in the feed section until the document sheet is nipped by a transport roller disposed in the sheet discharging section, the feed section being further provided with a feed pinch roller and a first urging means, the feed pinch roller being in contact with the feed roller via a document sheet and rotating in accordance with a rotation of the feed roller, and the first urging means pressing and urging the feed pinch roller so that a pressure of the feed pinch roller to the feed roller is maintained constant.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENTS

Figure 1:
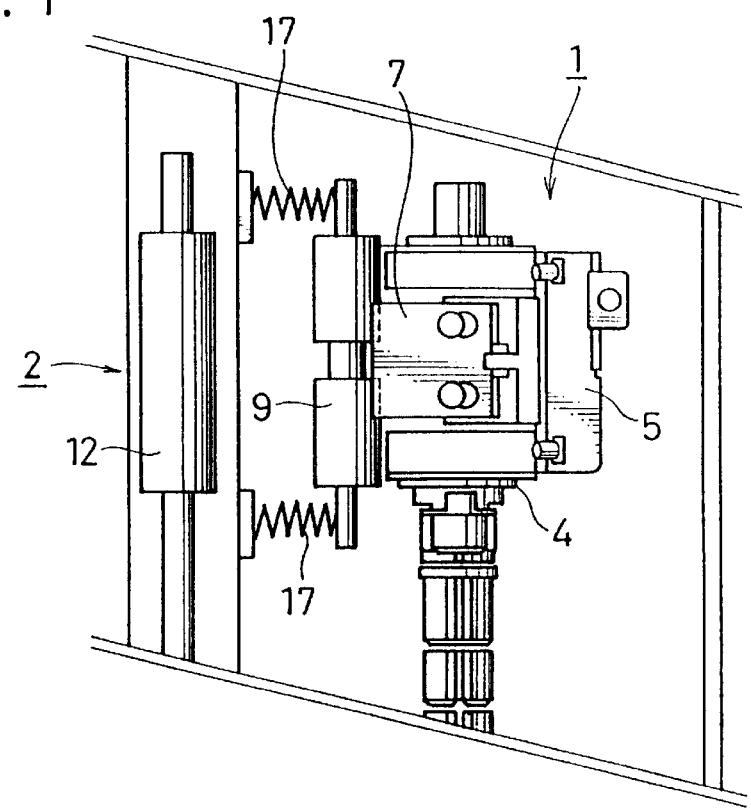
FIG. 1 is a plan view showing an essential part of a document reading apparatus in accordance with an embodiment of the present invention.

The present invention is characterized in that the feed section is provided with a feed pinch roller and a first urging means. The feed pinch roller is in contact with the feed roller via a document sheet and rotates in accordance with a rotation of the feed roller. The first urging means presses and urges the feed pinch roller so that a pressure of the feed pinch roller to the feed roller is maintained constant.

The feed section may be further provided with a sheet separating means which is always in pressing contact with an outer surface of the feed roller for selecting one sheet out of the overlying document sheets transported onto the feed roller, and the feed pinch roller may be disposed downstream of the sheet separating means. This achieves a compact construction in which the press contact section of the sheet separating means and the feed pinch roller are both in contact with the single feed roller. Therefore, it is possible to avoid forming a structure in which a sheet separating means and a feed means (feed roller) having a feed pinch roller are made with separate members having no shared parts.

The sheet separating means may include, for example, a separating rubber plate and a separating press plate. The separating rubber plate forms a predetermined friction force between the sheet separating means and a surface of the document sheet supplied onto the feed roller. The separating press plate presses the separating rubber plate onto the feed roller.

Here, the pressure of the feed pinch roller to the feed roller may be larger than the pressure of the sheet separating means to the document sheet on the feed roller. Thus, a sheet transport force generated between the feed pinch roller and the feed roller is larger than a sheet transport force generated between the sheet separating means and the feed roller when a document sheet is transported by the feed roller. Therefore, the document sheet separated by the sheet separating means is not pulled back by the pressure of the sheet separating means when the document sheet is sent out by the feed roller. This construction reduces the dispersion of the starting position of reading the document sheet due to the difference in the kind of document sheets and improves the accuracy of feeding the document sheets.

The first urging means may be, for example, a spring.

The sheet discharging section may be further provided with a transport pinch roller and a second urging means. The transport pinch roller is in contact with the transport roller via a document sheet and is rotating in accordance with a rotation of the transport roller. The second urging means presses and urges the transport pinch roller so that the pressure of the transport pinch roller to the transport roller is maintained constant. This construction improves the accuracy of feeding the document sheets when the document sheet supplied from the feed section by the feed roller is nipped by the transport roller and subsequently sent out to the reading section.

In the above construction, the pressure of the transport pinch roller to the transport roller may be about the same as the pressure of the feed pinch roller to the feed roller. Thus, when the document sheet is in contact with both the feed roller and the transport roller, the document sheet is smoothly handed over from the feed roller to the transport roller without being pulled or pushed between the feed roller and the transport roller.

In the construction in which a transport pinch roller having a second urging means is provided in the sheet discharging section as described above, the reading section may be located on the sheet discharging section, and the transport pinch roller may be disposed upstream or downstream of the reading section.

The second urging means may be, for example, a spring.

The document reading apparatus of the present invention may be used, for example, in a facsimile transmission system.

Figure 2:
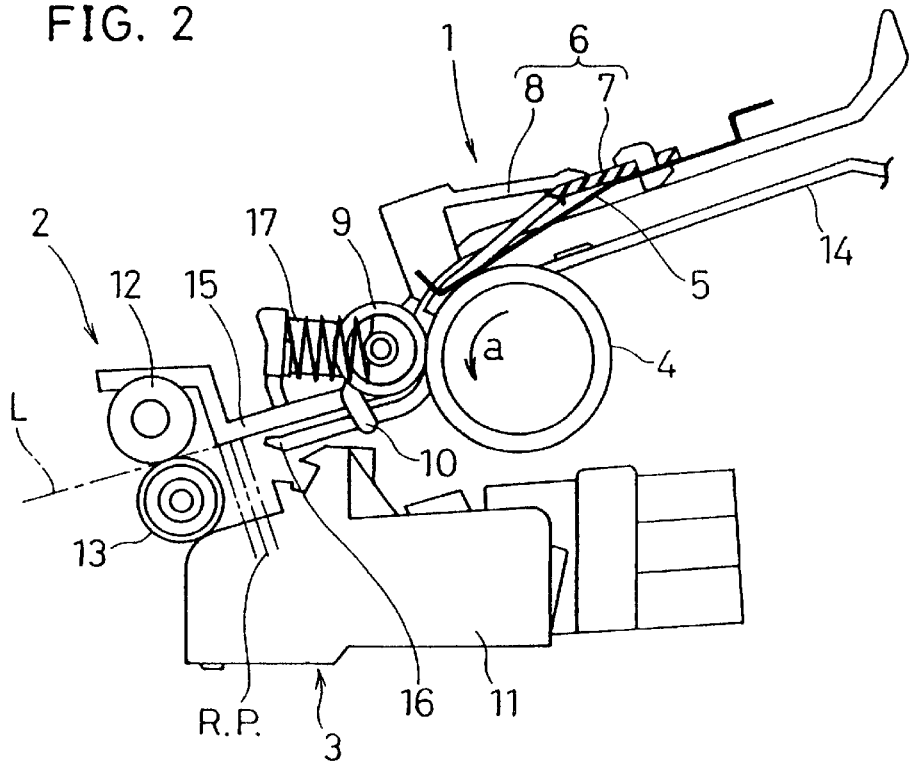
FIG. 2 is a side view showing the essential part of the document reading apparatus of FIG. 1 in accordance with the embodiment of the present invention.

Hereafter, an embodiment in which the present invention is applied to a transmission system of a facsimile apparatus is detailed with reference to FIGS. 1 and 2 in the attached drawings. FIGS. 1 and 2 are a top view and a side view, respectively, of a document reading apparatus according to the embodiment of the present invention. The document reading apparatus shown in FIGS. 1 and 2 is constructed with a feed section 1 for feeding a document sheet, a sheet discharging section 2 located downstream of the feed section 1 in the direction of transporting the document sheet, a reading section 3 located between the feed section 1 and the sheet discharging section 2, and a sheet detecting section (sheet sensor 10). The reference symbol L represents a sheet path and R.P. represents a reading position.

The feed section 1 is provided with a feed roller 4, a feed spring 5, and a sheet separating means 6. The feed spring 5 and the sheet separating means 6 allow the document sheet to fit on the feed roller 4. The sheet separating means 6 is always in press contact with the outer surface of the feed roller 4 and selects one sheet out of the overlying document sheets transported onto the feed roller 4. The sheet separating means 6 is constructed with a separating rubber plate 7 for separating the document sheets and a separating press plate 8 for pressing the separating rubber plate 7. Also, a later-mentioned first pinch roller 9 (feed pinch roller) is disposed downstream of the sheet separating means 6.

The sheet sensor 10 is located upstream of the reading section 3 and detects the front edge of the document sheet. The reading section 3 is provided with an optical system unit 11 for reading the document sheet. The sheet discharging section 2 is provided with a transport roller 12 for transporting the document sheet and a second pinch roller 13 (transport pinch roller) for pressing the transport roller 12. Further, a sheet tray 14 is mounted upstream of the feed roller 4; and upper and lower sheet guides 15, 16 are mounted between the feed roller 4 and the optical system unit 11.

The first pinch roller 9 is in contact with the feed roller 4 via the document sheet and rotates in accordance with the rotation of the feed roller 4 so as to transport the document sheet from the feed roller 4 to the transport roller 12. The first pinch roller 9 is mounted onto the upper sheet guide 15 and is pressed and urged by a spring 17 constituting a first urging means, whereby the pressure of the first pinch roller 9 to the feed roller 4 is maintained constant.

The spring 17 is also mounted onto the upper sheet guide 15 in the same manner as the first pinch roller 9. Further, the pressure of the first pinch roller 9 to the document sheet on the feed roller 4 is larger than the pressure of the sheet separating means 6 to the document sheet on the feed roller 4.

The above-mentioned construction allows that the document sheets transported from the sheet tray 14 to the feed roller 4 are separated midway therebetween by the sheet separating rubber plate 7 and, at the same time, pressed by the feed spring 5 to be guided to fit on the feed roller 4. At this time, the feed roller 4 is rotating at a constant speed in a direction shown by arrow (a), and the document sheet is sent out to the reading section 3 by the rotation of the feed roller 4.

Midway therebetween, the sheet sensor 10 detects the document sheet and, upon receiving the detection signal, the optical system unit 11 starts to read the document sheet. The front edge of the document sheet having passed the reading section 3 is nipped by the transport roller 12 and the second pinch roller 13. Thereafter, the document sheet is transported in such a manner that the transport roller 12 receives the document sheet from the feed roller 4. The document sheet which has been read by the reading section 3 is then discharged by the transport roller 12.

In this operation, when the document sheet is transported by the feed roller 4 under the pressure of the sheet separating means 6, the first pinch roller 9 disposed downstream of the separating rubber plate 7 rotates in accordance with the rotation of the feed roller 4 by the friction with the document sheet under a constant pressure exerted by the urging force of the spring 17, and presses the document sheet against the feed roller 4.

In this case, since the pressure of the first pinch roller 9 to the document sheet on the feed roller 4 is larger than the pressure of the sheet separating means 6 to the document sheet, the sheet transport capability generated between the first pinch roller 9 and the feed roller 4 is larger than the sheet transport capability generated between the separating rubber plate 7 and the feed roller 4. Thus, the document sheet is transported by the first pinch roller 9 and the feed roller 4 until the document sheet is nipped by the transport roller 12.

Figure 6:
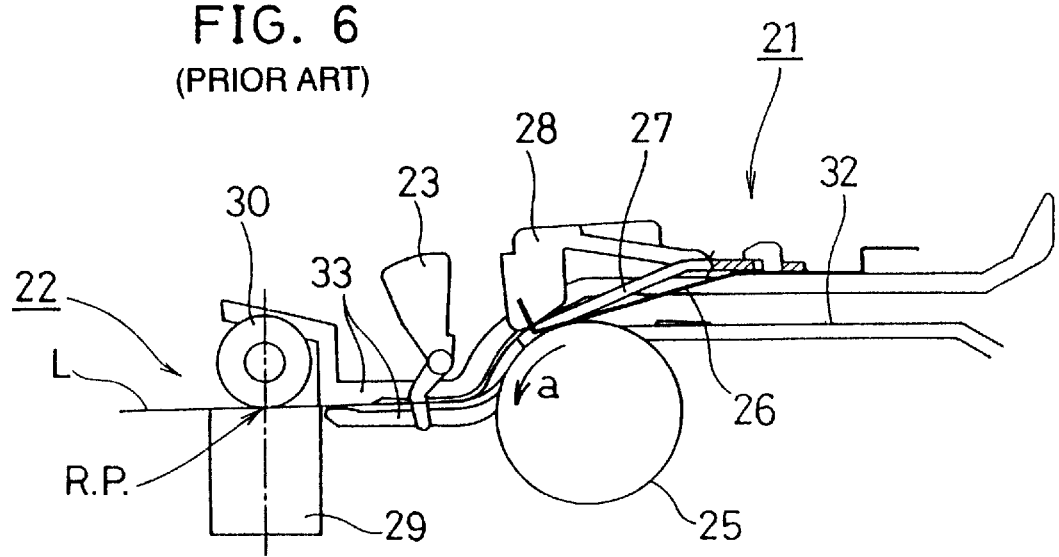
FIG. 6 is a side view showing an essential part of another prior art document reading apparatus.
Figure 7:
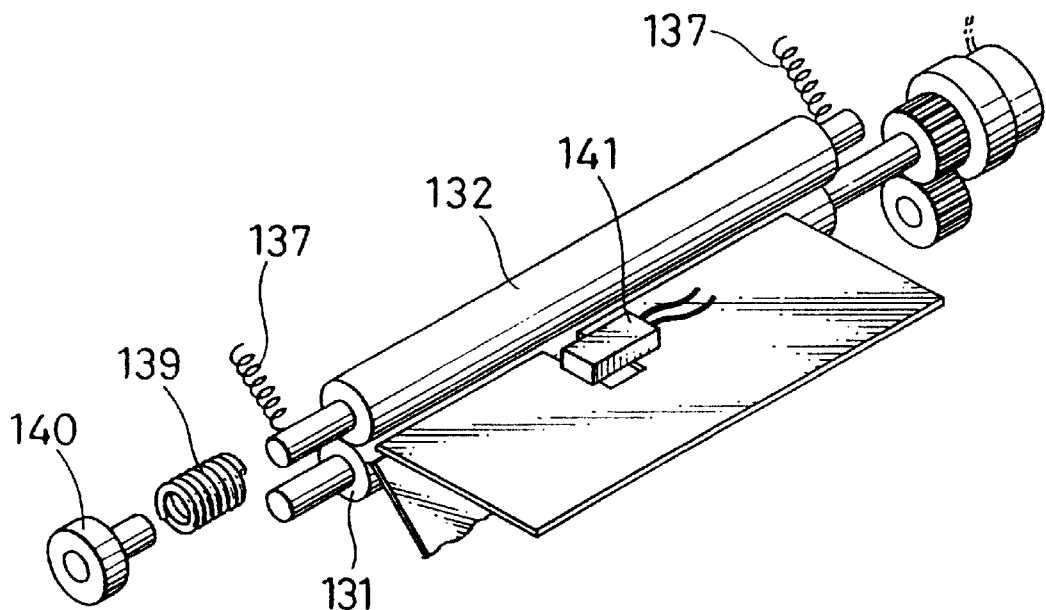
FIG. 7 is a perspective view showing a feed mechanism section of still another prior art document reading apparatus.

Therefore, in this embodiment, it is possible to reduce the dispersion in the starting position of reading the front edge of the document sheet between the sheet sensor 10 and the optical system unit 11 due to the difference in the kind of document sheets and to improve the accuracy of transporting the document sheets. Also, it is possible to prevent elongation of the document sheet between the optical system unit 11 and the transport roller 12 due to poor feed. The present invention can also be applied to a transmission system of a facsimile apparatus in which the reading section is located on the sheet discharging section as shown in FIG. 6.

Figure 3:
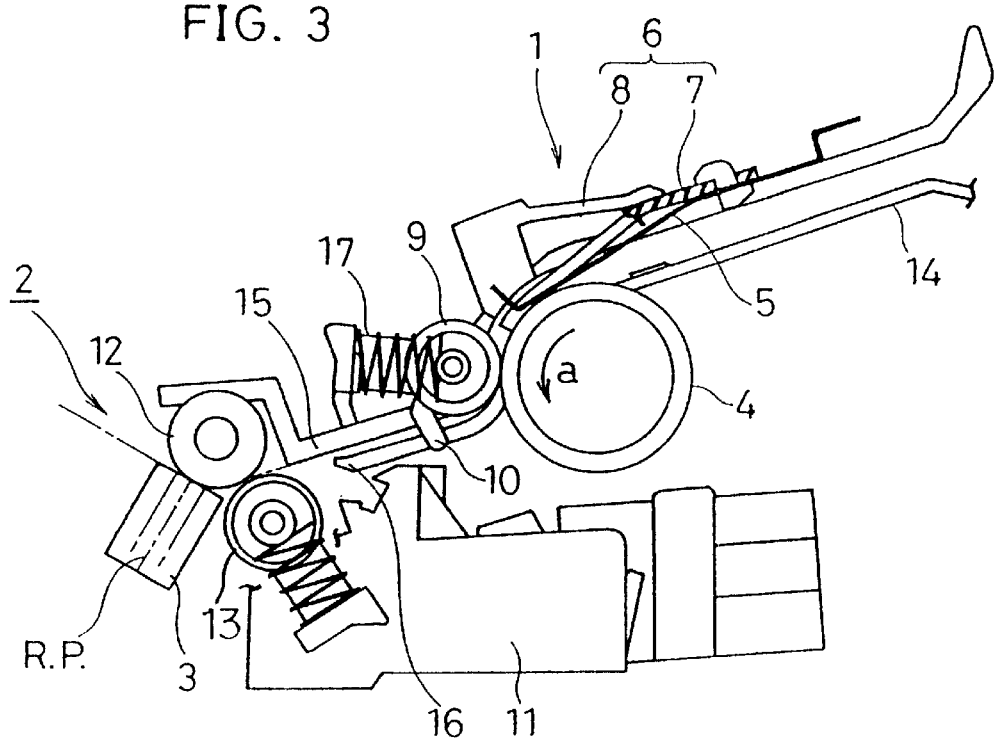
FIG. 3 is a side view showing an essential part of a document reading apparatus in accordance with another embodiment of the present invention.

Namely, the sheet discharging section 2 may further include a second pinch roller 13 (transport pinch roller) and a spring 57 (second urging means), as shown in FIG. 3. The second pinch roller 13 is in contact with the transport roller 12 via the document sheet and rotates in accordance with the rotation of the transport roller 12. The spring 57 presses and urges the second pinch roller 13 so that the pressure of the second pinch roller 13 to the transport roller 12 is maintained constant. This construction improves the accuracy of transporting the document sheet when the document sheet supplied from the feed section 1 by the feed roller 4 is received by the transport roller 12 and subsequently sent out to the reading section 3.

In this embodiment, the reading section 3 is located on the sheet discharging section 2, and the second pinch roller 13 is disposed downstream of the reading section 3. Alternatively, the second pinch roller 13 may be disposed upstream of the reading section 3. It will be apparent from FIG. 3 that the latter construction can be formed easily.

Furthermore, the present invention can be applied to other simplified feed mechanisms in which the transport roller 12 performs both the function of transporting to the reading section 3 the document sheet supplied from the feed section 1 and the function of discharging the document sheet after the document sheet is read by the reading section 3.

Figure 4:
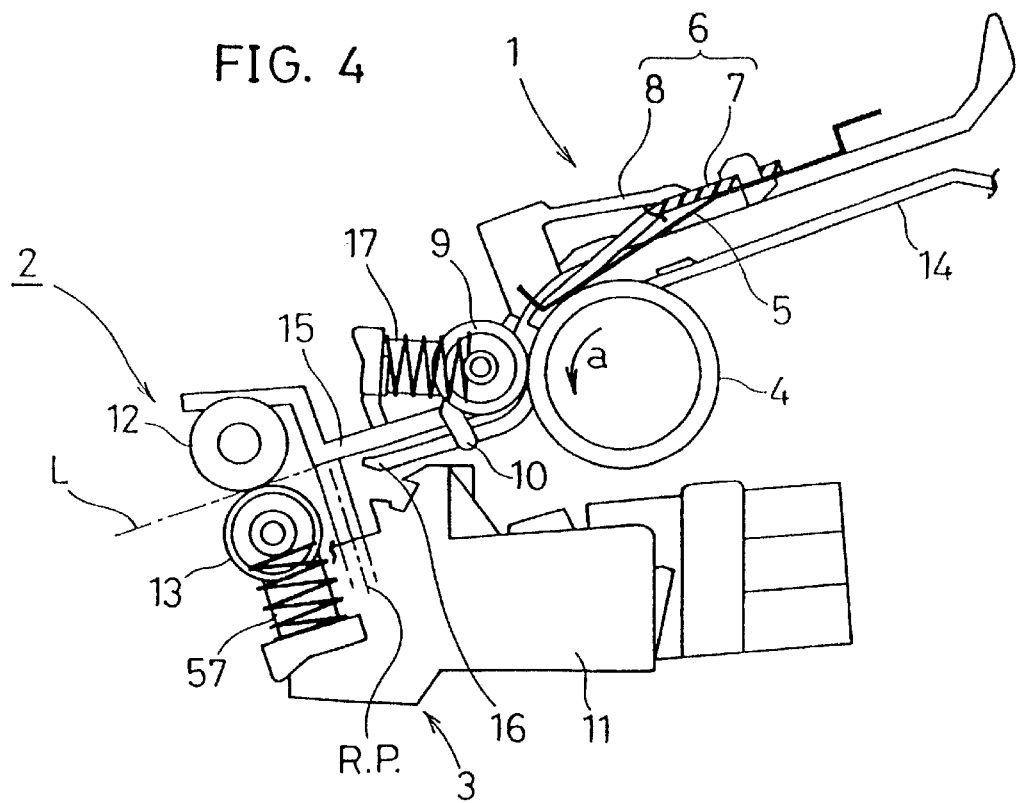
FIG. 4 is a side view showing an essential part of a document reading apparatus in accordance with still another embodiment of the present invention.
Figure 5:
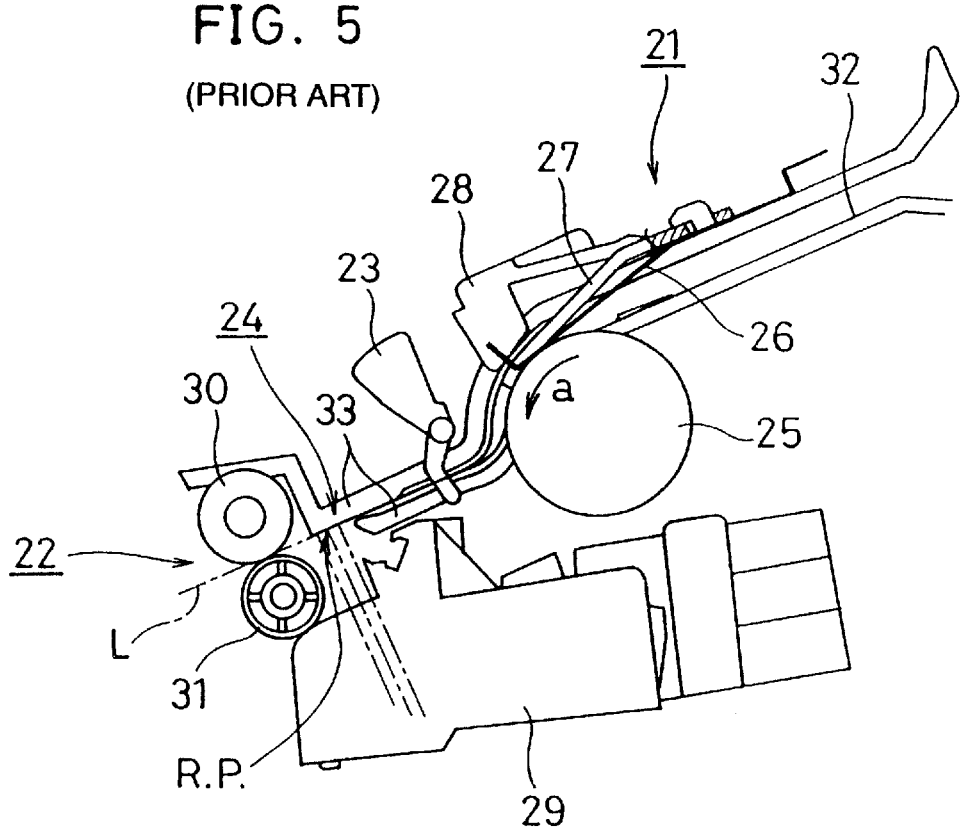
FIG. 5 is a side view showing an essential part of a prior art document reading apparatus.

In other words, the sheet discharging section 2 shown in FIGS. 1 and 2 may be further provided with a spring 57 (second urging means) for pressing and urging the second pinch roller 13, as shown in FIG. 4. This construction improves the accuracy of sheet feeding when the document sheet supplied from the feed section 1 by the feed roller 4 is received by the transport roller 12 and subsequently sent out to the reading section 3 while being discharged from the sheet discharging section 2.

To sum up, the present invention can improve the image quality, for example, in a transmission system of a facsimile apparatus or the like provided with one transport roller and one feed roller. Also, the deviation in quality can be reduced to a great extent in the manufacturing process.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A document reading apparatus comprising:
   a feed section for supplying a document sheet;
   a sheet discharging section located downstream of the feed section in a direction of transporting the document sheet;
   a reading section; and
   a sheet detecting section located upstream of the reading section,
   wherein the document sheet is transported by a feed roller disposed in the feed section until the document sheet is nipped by a transport roller disposed in the sheet discharging section,
   the feed section being further provided with a feed pinch roller and a first urging means,
   the feed pinch roller being in contact with the feed roller via a document sheet and rotating in accordance with a rotation of the feed roller,
   the first urging means pressing and urging the feed pinch roller so that a pressure of the feed pinch roller to the feed roller is maintained constant,
   the sheet discharging section comprising said transport roller, a transport pinch roller and a second urging means,
   the transport pinch roller being in contact with the transport roller via a document sheet and rotating in accordance with a rotation of the transport roller,
   the second urging means pressing and urging the transport pinch roller so that the pressure of the transport pinch roller to the transport roller is maintained constant, and
   the pressure of the transport pinch roller to the transport roller is about the same as the pressure of the feed pinch roller to the feed roller.

2. The document reading apparatus of claim 1, wherein the first urging means comprises a spring.

3. The document reading apparatus of claim 1, wherein the reading section is located on the output side of the sheet discharging section, and the transport pinch roller is disposed upstream or downstream of the reading section.

4. The document reading apparatus of claim 1, wherein the second urging means comprises a spring.

5. The document reading apparatus of claim 1, which is used in a facsimile transmission system.

6. The document reading apparatus of claim 1, wherein the reading section is located on the output side of the sheet discharging section.

7. The document reading apparatus of claim 1, wherein the reading section is located between the feed section and the sheet discharging section.

8. A document reading apparatus comprising:
   a feed section for supplying a document sheet;
   a sheet discharging section located downstream of the feed section in a direction of transporting the document sheet; and
   a reading section,
   wherein the document sheet is transported by a feed roller disposed in the feed section until the document sheet is nipped by a transport roller disposed in the sheet discharging section,
   the feed section being further provided with a feed pinch roller and a first urging means,
   the feed pinch roller being in contact with the feed roller via a document sheet and rotating in accordance with a rotation of the feed roller,
   the first urging means pressing and urging the feed pinch roller so that a pressure of the feed pinch roller to the feed roller is maintained constant,
   wherein the feed section is further provided with a sheet separating means which is always in pressing contact with an outer surface of the feed roller for selecting one sheet out of overlying document sheets transported onto the feed roller, and the feed pinch roller is disposed downstream of the sheet separating means, and
   wherein the pressure of the feed pinch roller to the feed roller is larger than the pressure of the sheet separating means to the document sheet on the feed roller.

9. The document reading apparatus of claim 8, wherein the sheet separating means comprises a separating rubber plate and a separating press plate, the separating rubber plate forming a predetermined friction force between the sheet separating means and a surface of the document sheet supplied onto the feed roller, and the separating press plate pressing the separating rubber plate onto the feed roller.

10. The document reading apparatus of claim 8, wherein the reading section is located on the output side of the sheet discharging section.

11. The document reading apparatus of claim 8, wherein the reading section is located between the feed section and the sheet discharging section.

12. The document reading apparatus of claim 8, further comprising:
    a sheet detecting section located upstream of the reading section.

13. A feed section for a document reading apparatus comprising:
    a feed roller;
    a document sheet separating mechanism in pressing contact with said feed roller for selecting one of a plurality of document sheets overlaying said feed roller;
    a feed pinch roller downstream of said sheet separating mechanism; and
    a biasing mechanism for biasing said feed pinch roller into contact with said feed roller,
    wherein the force applied by said feed pinch roller to the selected document on said feed roller is greater than the force applied by said document sheet separating mechanism to the selected document sheet on the feed roller.

14. The feed section of claim 13, wherein said biasing mechanism is a spring.

15. The feed section of claim 13, wherein said document sheet separating mechanism comprises a friction plate and a press plate, said friction plate forming a friction force between said document sheet separating mechanism and the selected document sheet, said press plate pressing said friction plate onto said feed roller.

16. The feed section of claim 15, wherein said friction plate comprises a rubber friction plate.

* * * * *